United States Patent [19]

Soga et al.

[11] Patent Number: 5,028,938

[45] Date of Patent: Jul. 2, 1991

[54] PRINTING HEAD

[75] Inventors: Hiroo Soga; Eiichi Akutsu, both of Kanagawa, Japan

[73] Assignee: Fuji Xerox Co., Ltd., Tokyo, Japan

[21] Appl. No.: 430,297

[22] Filed: Nov. 2, 1989

[30] Foreign Application Priority Data

Nov. 29, 1988 [JP] Japan ............................... 63-299490

[51] Int. Cl.[5] ...................... G01D 15/06; G01D 15/10

[52] U.S. Cl. ................................ 346/155; 346/76 PH

[58] Field of Search ........................... 346/155, 76 PH

[56] References Cited

U.S. PATENT DOCUMENTS 4,233,611 11/1980 Nakano et al. ...................... 346/155

4,935,755 6/1990 Akutsu et al. ...................... 346/155

4,958,998 9/1990 Yamauchi et al. .................. 423/445

*Primary Examiner*—George H. Miller, Jr.

*Attorney, Agent, or Firm*—Finnegan, Henderson, Farabow, Garrett and Dunner

[57] ABSTRACT

A printing head comprising a plurality of printing electrodes positioned in parallel with each other on a surface of an electrically insulating board. At least the sliding surfaces of the printing electrodes, or electrically conductive projections formed near the front edge of the plurality of the printing electrodes, are coated with a high melting point metal whose volume resistivity is not greater than $10^{-4}\Omega\cdot cm$ and whose melting point is not smaller than 1500° C. The high melting point metal may be comprised of one or more of the elements of the group of Mo, W, Ru, Rh, Re, Ta, Ti, and Zr. The electronically insulating board may be comprised of an elastic layer.

6 Claims, 2 Drawing Sheets

PRINTING HEAD

BACKGROUND OF THE INVENTION

1. Field of the Invention

This invention relates to a printing head for applying an image-responsive electrical signal to a printing medium.

2. Description of the Prior Art

A printing method, known as electric transfer printing, has been proposed in which an image-responsive electrical signal is changed into heat to melt an ink layer and transfer it to paper, thereby forming an image.

One printing head for such a method comprises integral printing electrodes and return electrodes. Each of the return electrodes has a greater contact area than each of the printing electrodes. (See, for example, Japanese Patent Application (OPI) No. 171666/84 (the term "OPI" as used herein means an "unexamined published application")). Other proposed printing heads include one comprising printing electrodes formed of a metal layer patterned on a ceramic board, or one comprising a lamination of printing electrode materials and ceramic materials.

In the printing head of the former type, the printing electrodes and the return electrodes are provided on a surface which is put in contact with a printing medium, so that the pressure contact area of the printing head is large. For this reason, the total contact pressure needs to be high, which not only makes it difficult to apply a uniform pressure but also requires a large torque for driving rollers. As a result, the reliability of printing performance is low.

To make an image recording with the printing head of the latter type, it is required that an end portion of the surface of the printing head be in surface contact with the printing medium. This means that any inclination of the printing head toward the printing medium drastically impairs the contact ratio. Hence, the printing head must always be maintained parallel to the printing medium, which imposes the problem of requiring a highly accurate printing head holding mechanism.

SUMMARY OF THE INVENTION

The object of this invention is, therefore, to provide a printing head in which the reliability of contact between the electrodes and the printing medium is high, a satisfactory contact with the printing medium can be achieved even with a low contact pressure, and the life of the printing head is long.

A printing head according to this invention comprises a plurality of printing electrodes positioned in parallel with each other on a surface of an electrically insulating board, wherein at least sliding surfaces of the printing electrodes are coated with a high melting point metal whose volume resistivity is not greater than $10^{-4}\Omega\cdot$cm and whose melting point is not smaller than 1500° C.

A printing head according to this invention may also comprise electrically conductive projections formed near the front edge of the plurality of printing electrodes positioned in parallel with each other on a surface of an electrically insulating board; and in such a case, the electrically conductive projections are coated with a high melting point metal whose volume resistivity is not greater than $10^{-4}\Omega\cdot$cm and whose melting point is not smaller than 1500° C.

In this invention, the above-mentioned high melting point metal may be one or more kinds of elements selected from a group of Mo, W, Ru, Rh, Re, Ta, Ti, and Zr.

A printing head according to this invention may further comprise an electrically insulating board having an elastic layer.

A printing head according to this invention may further be provided with slits between the printing electrodes. In such a case, each of the printing electrodes is put in pressure contact individually or in small groups, whereby infiltration of foreign matter such as dust into the printing electrode does not cause the entire printing head to be in loose contact; or even if a part of the printing head is put in loose contact, such loose contact does not affect other electrodes.

BRIEF DESCRIPTION OF THE DRAWINGS

The manner by which the above objects, and other objects, features, and advantages of the present invention are attained will be fully apparent from the following detailed description when it is considered in view of the drawings, wherein.

DESCRIPTION OF THE PREFERRED EMBODIMENT

Preferred embodiments of this invention will be described with reference to the accompanying drawings.

The printing head according to this invention is used to make an image in an electric transfer printing system or electrostatic printing system. For example, in the electric transfer system, the printing head is put in contact with a printing medium comprising a heating layer and a fusible ink layer so that the plurality of printing electrodes of the printing head slide over the printing medium. An electric image signal is applied from the printing head to the heating layer, converting electrical energy to heat in the heating layer to fuse the neighboring ink layer, depending on the form of the image. The fused ink layer is transferred to a carrying material (generally, paper) to make the image thereon for recording.

In the printing head according to this invention, at least the sliding surfaces of the printing electrodes or the electrically conductive projections on the printing electrodes are coated with a high melting point metal whose volume resistivity is not greater than $10^{4}\Omega\cdot$cm and whose melting point is not smaller than 1500° C. Such a high melting point metal is excellent in wear resistance because of its characteristically great hardness, making the electrodes no longer subject to significant wear due to their sliding movements. Further, the metal is of high melting point, such that the electrodes can be protected even from the high temperatures caused by an arc discharge.

Figure 1:
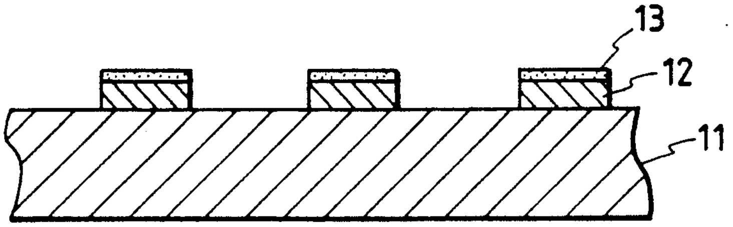
FIG. 1 is a basic transverse cross section of one embodiment of the present invention.
Figure 2:
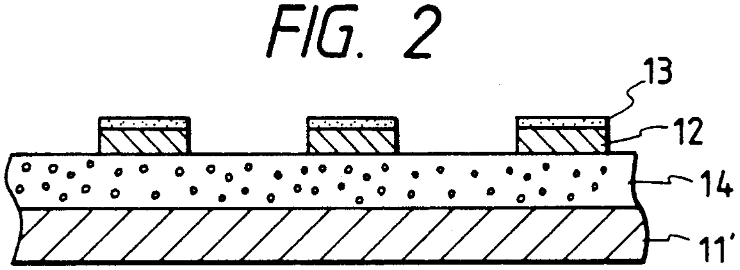
FIG. 2 is a transverse cross section of one embodiment of the present invention, wherein the electrically insulating board comprises a rigid board and an electrically insulating layer.
Figure 3:
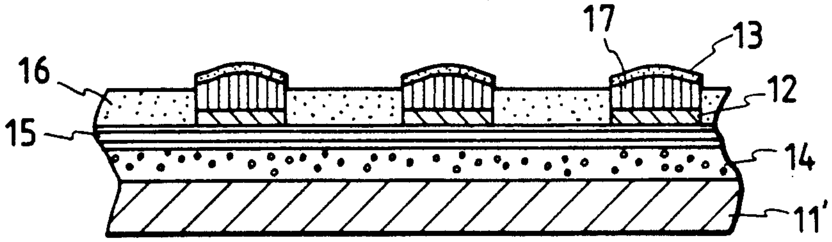
FIG. 3 is a transverse cross section of one embodiment of the present invention, wherein the electrically insulating board further comprises an electrically insulating film on which the printing electrodes, coated with an electrically insulating layer, are provided.

FIGS. 1, 2 and 3 show traverse sectional views of the embodiments according to the present invention. In FIG. 1, printing electrodes 12 are provided on a surface of an electrically insulating rigid board 11, where the surfaces of the printing electrodes are coated with a high melting point metal film 13. In FIG. 2, an electrically insulating board is made up of a rigid board 11' and an electrically insulating elastic layer 14 on which printing electrodes 12 are provided. As in FIG. 1, the top surfaces of the printing electrodes are coated with a high melting point metal film 13. In FIG. 3, an electrically insulating board is made up of a rigid board 11', an electrically insulating elastic layer 14 and an electrically insulating film 15, inter alia, on which printing electrodes 12 are provided. The printing electrodes are coated with an electrically insulating layer 16, such that a part of each of the printing electrodes is exposed. In the exposed part, projections 17 made of an electrically conductive material are formed. The top surfaces of the projections are coated with a high melting point metal film 13.

In the present invention, the electrically insulating board is made of an electrically insulating material, a rigid metal body on which an electrically insulating material is deposited, or the like. The electrically insulating material may include electrically insulating resins such as polyester, polyvinyl chloride, polyurethan, polyorganosilicone, polyacetal, polyimide resin, polyamide resin, polyacrylate, polyurea, and epoxy resin. Elastomer may also be used. When the electrically insulating board is made of an electrically insulating resin, it is preferable that the thickness of the board be 0.1 mm to 7 mm. If the thickness is smaller than 0.1 mm, the printing head cannot be in contact with the printing medium under sufficient elastic pressure, while if the thickness is greater than 7 mm, the board acts as a rigid body, such that the printing head cannot be maintained in continuous contact with the printing medium at a stable pressure. When an aluminum or other rigid metal body is used, the surfaces must be provided with an electrically insulating layer, or preferably, an electrically insulating elastic layer.

On the electrically insulated board a plurality of printing electrodes are positioned in parallel in a strip format. The material that can be used includes any of electrically conductive metals selected from the group consisting of Ni, Cr, Au, Cu, Fe, Al, Zn, Sn, Pt, Pb, and an alloy containing such a material. The specific volume resistivity required of these materials should be $10^{-4}\Omega\cdot cm$ or less. When the printing electrodes are to be provided on the electrically insulating board, an electrically conductive film of between approximately 0.1 $\mu m$ and 50 $\mu m$ in thickness may be formed on the board from any of the above-mentioned electrode materials by one of the following methods, depending upon the materials used for the printing electrodes and the electrically insulating board: foil adhesion, electrolytic plating, electroless plating, vacuum evaporative deposition, sputtering, printing and other coating, physical vapor deposition, chemical vapor deposition, plasma filming, or the like. To form the printing electrodes in a strip format, a film of an electrically conductive layer may be patterned by combining lithography—based on ordinary light, laser beam, or electron beam—with either wet or dry etching. The printing electrodes may otherwise be made by subjecting the electrically conductive layer to a direct printing.

The printing electrodes thus formed are then coated, if so desired, with an electrically insulating layer. Such coating is made so that each of the printing electrodes will have an exposed portion near the front edge. In the case where electrically conductive projections are provided near the front edge of the printing electrodes, the coating is made so that the portions which form the electrically conductive projections will be exposed. The coating may be implemented in the following manner. An electrically-insulating photosensitive film (dry film) is fusion-bonded under pressure on the printing electrodes, and then removed by photolithography and wet etching, exposing portions of the printing electrodes corresponding to the portions which will be put in contact with the printing medium. Instead of the electrically-insulating photosensitive film, an electrically insulating film may be subjected to fusion-bonding under pressure to expose the portions of the printing electrodes by the combination of photolithography and dry etching using a resist film. The thickness of the electrically insulating film is preferably in the range of approximately 5 to 50 $\mu m$.

The electrically conductive projections are formed on the portions of the printing electrodes which are not subjected to coating with the electrically insulating layer; i.e., the exposed portions. The electrically conductive projections may be formed by bonding, for example, an electrically conductive metal such as Ni, Cr, and Cu to the exposed portions on the printing electrodes by electrolytic plating so that the projection is thicker than the thickness of the electrically insulating film. It is preferable to provide the electrically conductive projection so that it projects approximately 2.0 $\mu m$ to 100 $\mu m$, or more preferably, approximately 10 $\mu m$ to 40 $\mu m$ from the electrically insulating layer.

In the present invention, at least the sliding surfaces (edge surfaces) of the above printing electrodes or the electrically conductive projections are coated with a high melting point metal. The high melting point metal used should have a volume resistivity of not greater than $10^{-4}\Omega\cdot cm$ or, preferably, not greater than $10^{-5}\Omega\cdot cm$, and a melting point of not smaller than 1500° C. In particular, such metals as Mo, W, Ru, Rh, Re, Ta, Ti, and Zr may be used singularly or as an alloy composed of two or more kinds. In the case where Mo, W, Ru, Rh, or Re are used, such a method as plating, sputtering, or ion-plating may be applicable to form a coating. In the case where Ta, Ti, or Zr are used, a method such as sputtering or ion-plating may be applied to form the coating.

In the printing head according to this invention, slits may be provided between the printing electrodes on at least the front edge of the plurality of printing electrodes. The slits may be formed by rotary cutting with a cutting disk, laser processing, dry etching, fluid cuttings, or the like. The length of the slit is preferably in the range of approximately 5 mm to 40 mm from the printing head edge. However, the length of each slit is of such a nature as to be arbitrarily determined depending on the form of the projection on the printing electrode, so that there is some flexibility.

In the best mode presently contemplated for the present invention, a polymide film of 30 $\mu m$ in thickness was used as an electrically insulating film 11, upon which to form an electrode. On this film a copper foil of 15 $\mu m$ thickness was deposited and bonded by a thermosetting bonding agent as an electrode material. The bonded copper foil was then patterned by means of photolithography and etching so that the printing electrodes of 50 μm in width were formed at intervals of 125 μm in a strip format.

A thermosetting polyimide resin solution was then applied on the formed printing electrode side, and heated and hardened to provide an electrically insulating layer of 11 μm in thickness. The thermosetting polyimide resin was removed by photolithography and etching to form, on each printing electrode, an opening having a square cross-sectional shape of 50 μm on each side. Nickel was then deposited on the square openings by electroplating so that it projected 10 μm from the electrically insulating layer, forming projections made of nickel. Rhodium was further coated thereon at a thickness of 2 μm by electroplating (sulfuric bath plating method).

To make the projections provided on the printing electrodes serve as the contact electrodes of the printing head in the modified embodiment of FIG. 3, a conventional wiring board including insulating layer 15, inter alia, was reduced in substrate thickness to provide a height 14 μm below the array of projections. Then, upon the surface e.g., layer 11; upon or above which the projections were arranged, this wiring board, an insulating silicone rubber board of 1 mm in thickness, and a ground plane aluminum board of 3 mm in thickness were disposed in this order and bonded by a thermosetting bonding agent. In the bonding operation the edge of each material is aligned so that an array of conductive projections on the wiring board could be put appropriately in alignment with, and to contact selected ones of, the printing head edges. The result of this arrangement is to provide individual electrical connections for each printing head electrode.

As a comparative embodiment, a printing head was manufactured by the same method as in the above-mentioned embodiment, with the exception that the projections made of nickel were provided so that they projected 13 μm from the electrically insulating layer and that no coating with rhodium was provided.

Figure 4:
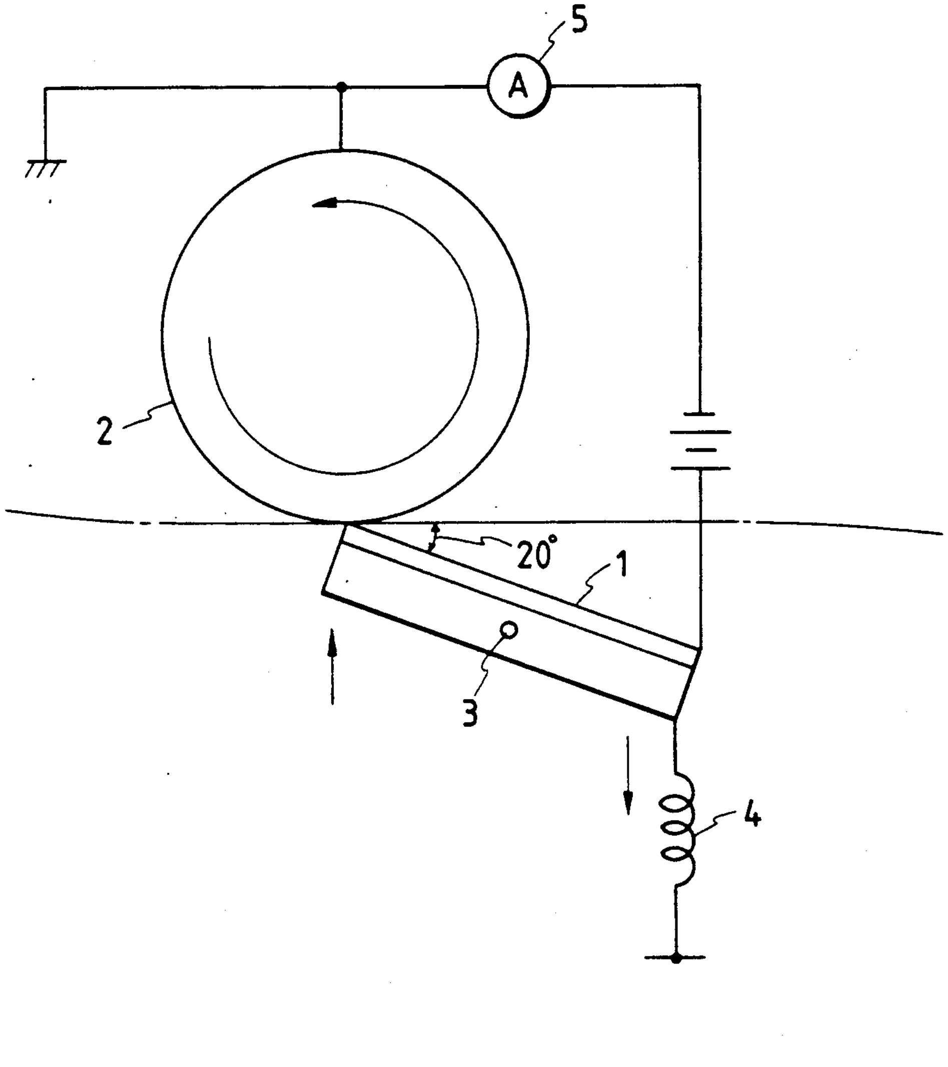
FIG. 4 shows a testing apparatus for evaluating a best mode of the preferred embodiment.

Electric conduction tests were conducted using a device shown in FIG. 4. The device comprises a printing head 1, which is put in pressure contact with an aluminum drum 2 by a pivot 3 and a pressure spring 4. Reference numeral 5 denotes the ammeter. Electric conduction between the printing electrode of each of the printing heads and the aluminum drum having a diameter of 100 mm and rotating at a speed of 60 rpm was monitored as the printing head was put in a pressure contact with the drum at an angle of 20° under a pressure of 200 g/cm$^2$. The monitoring was implemented by applying a voltage of 0.2 V to each printing electrode, measuring the current value, and checking the conduction ratio. The test results are tabulated in terms of a total drum rotation of 5,000 revolutions and 10,000 revolutions.

| | Initial Conduction Ratio | Conduction Ratio at 5,000 Revolutions | Conduction Ratio at 10,000 Revolutions |
|---|---|---|---|
| This invention | 100% | 98% | 92% |
| Comparative embodiment | 100% | 80% | 44% |

The projections of the printing head according to this invention were worn, but the wear was not as critical as to cause the nickel layer to be exposed. The projections of the printing head according to the comparative embodiment, however, were so worn that they were as low as the electrically insulating layer.

The printing head according to the present invention has, as described above, the surfaces of the printing electrodes or projections formed on the printing electrodes coated with a high melting point metal. When the printing head is put in pressure contact with the ink printing medium by sliding, the sliding portions of the electrodes may be prevented from wearing, thereby preventing any modification or deterioration such as oxidation, further contributing to the extension of the life of the printing head.

What is claimed is:

1. A printing head comprising a plurality of printing electrodes positioned approximately in parallel with each other on a surface of an electrically insulating board, wherein at least sliding surfaces of said printing electrodes are coated with a high melting point metal whose volume resistivity is not greater than $10^{-4}\Omega\cdot$cm and whose melting point is not smaller than 1500° C.

2. A printing head comprising a plurality of printing electrodes positioned approximately in parallel with each other on a surface of an electrically insulating board, wherein electrically conductive projections are formed near the front edge of said plurality of printing electrodes, and said electrically conductive projections are coated with a high melting point metal whose volume resistivity is not greater than $10^{-4}\Omega\cdot$cm and whose melting point is not smaller than 1500° C.

3. The printing head according to claims 1 or 2, wherein said high melting point metal comprises one or more members selected from the group consisting of Mo, W, Ru, Rh, Re, Ta, Ti, and Zr.

4. The printing head according to claims 1 or 2, wherein said electrically insulating board comprises an elastic layer.

5. The printing head according to claims 1 or 2, wherein said high melting point metal comprises rhodium.

6. The printing head according to claims 1 or 2, wherein slits are provided between said printing electrodes on at least the front edge of said plurality of printing electrodes.

* * * * *